April 2, 1957　　W. E. TEMPLETON　　2,787,111
COUNTERBALANCED RECIPROCATING CUTTING ASSEMBLY
Filed March 2, 1955　　6 Sheets-Sheet 3

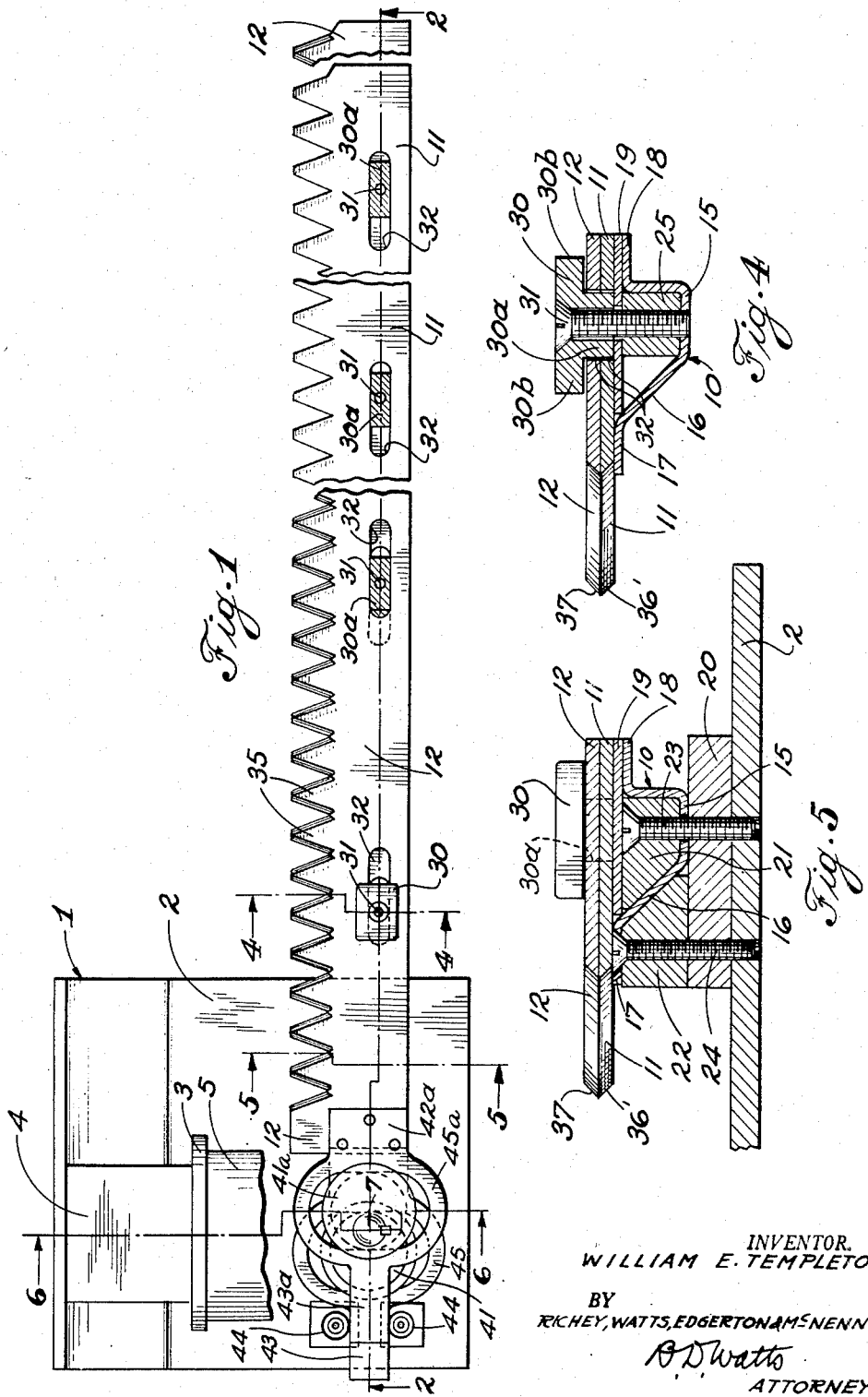

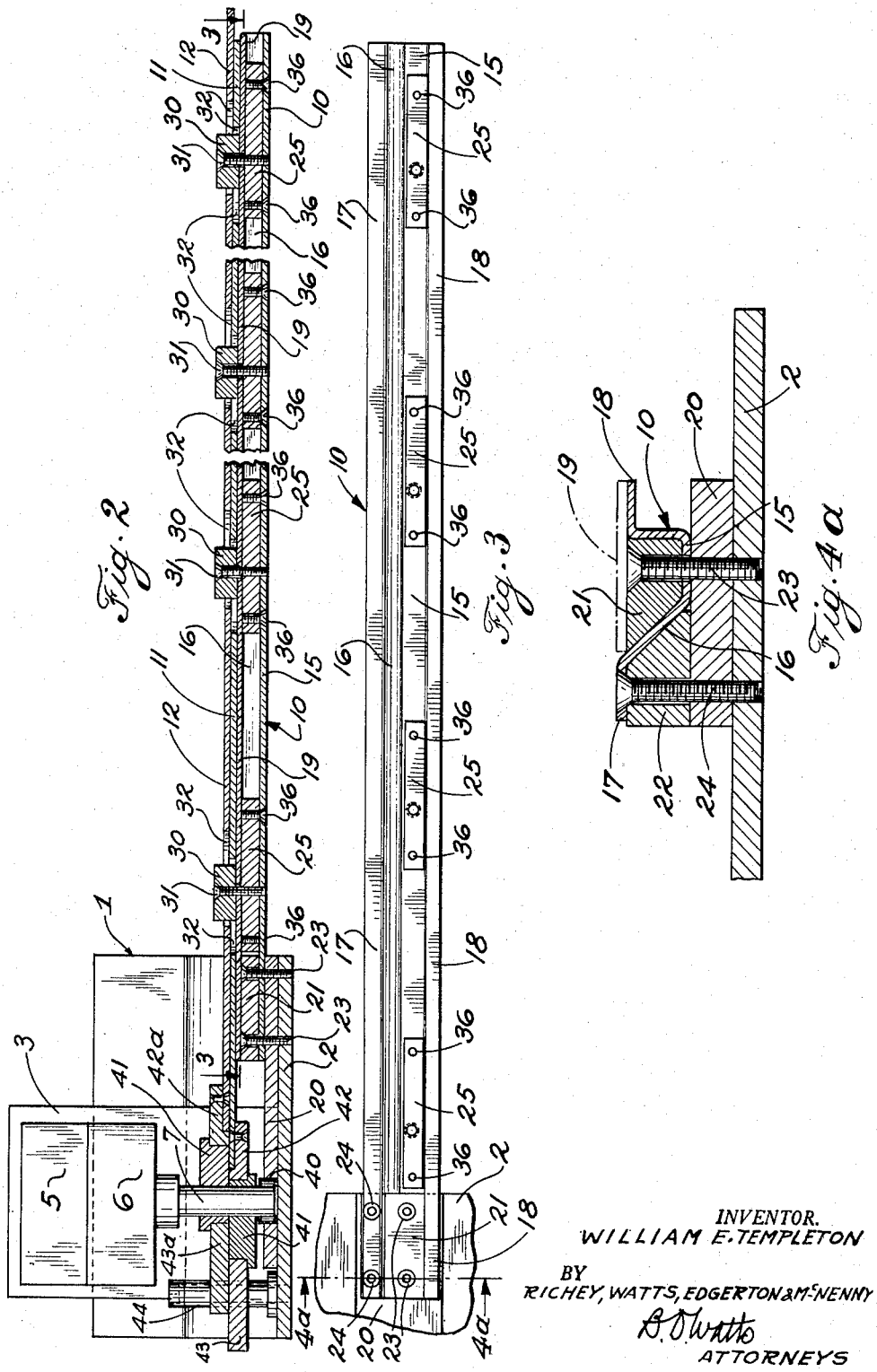

INVENTOR.
WILLIAM E. TEMPLETON
BY
RICHEY, WATTS, EDGERTON & McNENNY
ATTORNEYS

April 2, 1957 W. E. TEMPLETON 2,787,111
COUNTERBALANCED RECIPROCATING CUTTING ASSEMBLY
Filed March 2, 1955 6 Sheets-Sheet 4
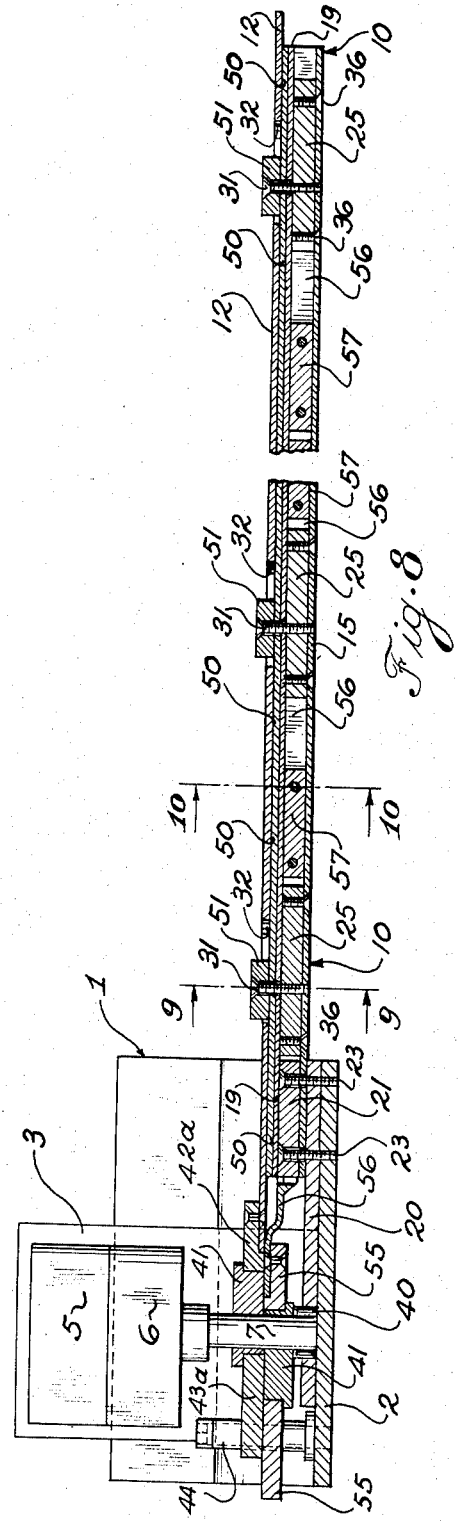
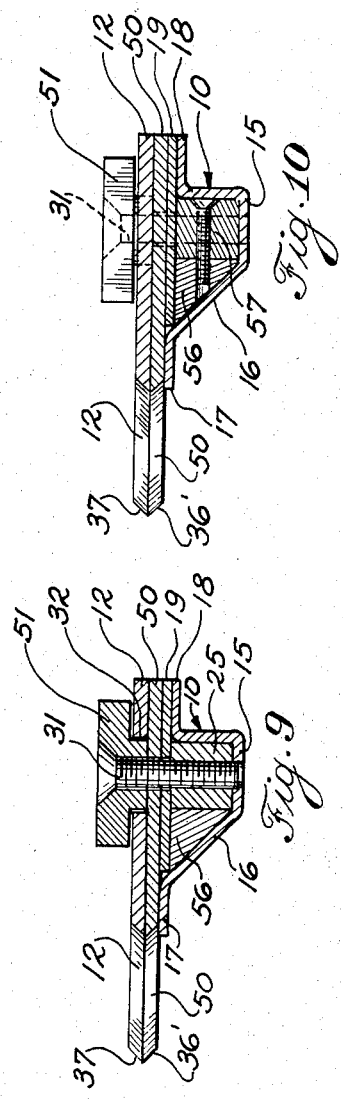
INVENTOR.
WILLIAM E. TEMPLETON
BY
RICHEY, WATTS, EDGERTON & McNENNY
ATTORNEYS April 2, 1957 W. E. TEMPLETON 2,787,111
COUNTERBALANCED RECIPROCATING CUTTING ASSEMBLY
Filed March 2, 1955 6 Sheets-Sheet 5
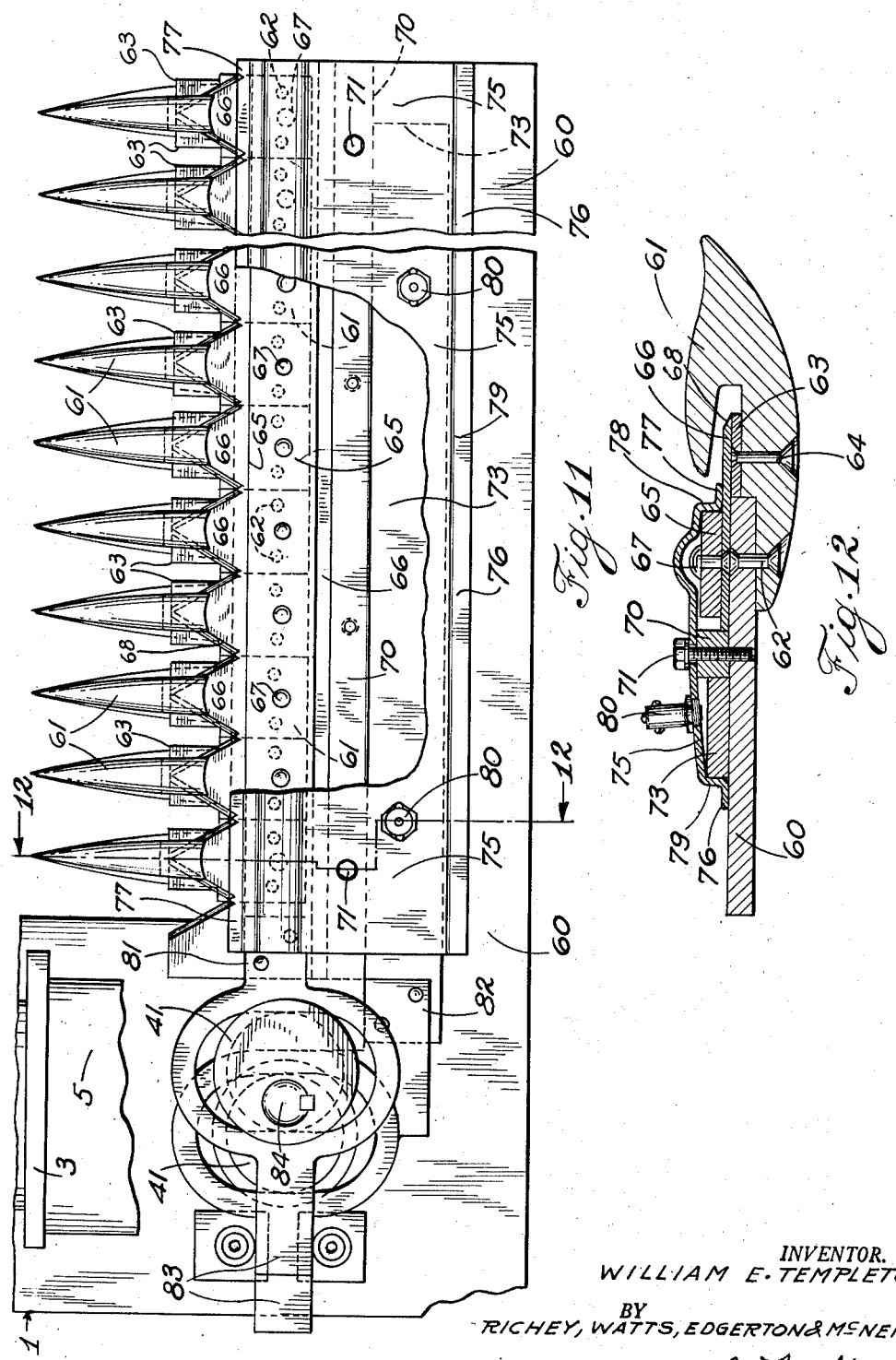
INVENTOR.
WILLIAM E. TEMPLETON
BY
RICHEY, WATTS, EDGERTON & McNENNY
B.D.Watts
ATTORNEYS April 2, 1957  W. E. TEMPLETON  2,787,111
COUNTERBALANCED RECIPROCATING CUTTING ASSEMBLY
Filed March 2, 1955  6 Sheets-Sheet 6

INVENTOR.
WILLIAM E. TEMPLETON
BY
RICHEY, WATTS, EDGERTON & McNENNY
ATTORNEYS

United States Patent Office 2,787,111
Patented Apr. 2, 1957

2,787,111

COUNTERBALANCED RECIPROCATING CUTTING ASSEMBLY

William E. Templeton, Lexington, Ohio

Application March 2, 1955, Serial No. 491,757

16 Claims. (Cl. 56—297)

This invention relates generally to the cutting art and is particularly concerned with a new power actuated cutter.

Cutters of the type used on mowing machines and the like have been in use for many years but, so far as I am aware, have always possessed the disadvantage of marked vibration. Usually the knife-carrying bar is reciprocated endwise on a support bar which carries teeth complementary to those on the knife bar, the knife bar being reciprocated endwise by a pitman type of drive. Since the knife bar is rapidly reciprocated endwise, shocks and vibrations due to the starting and stopping of the knife bar are considerable in amount with the result that undue stress is put on not only the cutter parts but also the supporting and reciprocating means. As a result, the life of the apparatus is not as great as is desirable.

The present invention aims to provide a cutter which may be of general use but which is particularly suitable for cutting grass and grains or clipping hedges, which will be free from substantially all vibrational forces, which will be light in weight but strongly resistant to bending forces, which will consist of a new combination of elements, and which will have a much longer service life than cutters possessing considerable vibrational force.

Briefly stated, these aims are attained by providing a cutter comprising a substantially rigid support bar, two endwise reciprocable members, one of which is a knife bar having teeth along one edge thereof, and an eccentric type drive which moves those members simultaneously in opposite directions. Vibrational forces traceable to movement of one member in one direction are offset by corresponding forces created by movement of the other member in the opposite direction, with the net result that these two forces substantially offset one another and the entire device is substantially free from vibration and does not transmit vibrational forces to the apparatus supporting the cutter.

The present invention will be better understood by those skilled in the art from the following specification read in conjunction with the accompanying drawings, in which:

Fig. 1 is a top plan view of a preferred form of apparatus embodying the present invention;

Fig. 2 is a vertical, sectional view taken on line 2—2 of Fig. 1;

Fig. 3 is a top plan view taken on line 3—3 of Fig. 2;

Fig. 4 is a transverse, sectional view taken on line 4—4 of Fig. 1;

Fig. 4a is a transverse, sectional view taken on line 4a—4a of Fig. 3;

Fig. 5 is a transverse, sectional view, partly in elevation, taken on line 5—5 of Fig. 1;

Fig. 8 is a view similar to Fig. 2 but showing another embodiment of the present invention;

Fig. 9 is a view similar to Fig. 4 but taken on line 9—9 of Fig. 8;

Fig. 10 is a cross-sectional view taken on line 10—10 of Fig. 8;

Fig. 11 is a fragmentary, top plan view of another embodiment of the present invention;

Fig. 12 is a cross-sectional view taken on line 12—12 of Fig. 11;

Figure 6:
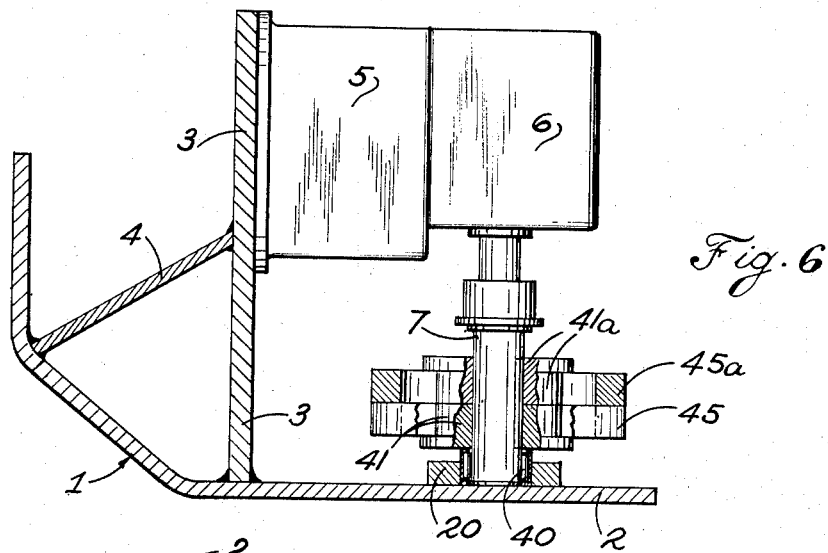
Fig. 6 is a transverse, sectional view, partly in elevation, taken on line 6—6 of Fig. 1 with parts removed to show the knife bar actuating mechanism.
Figure 7:
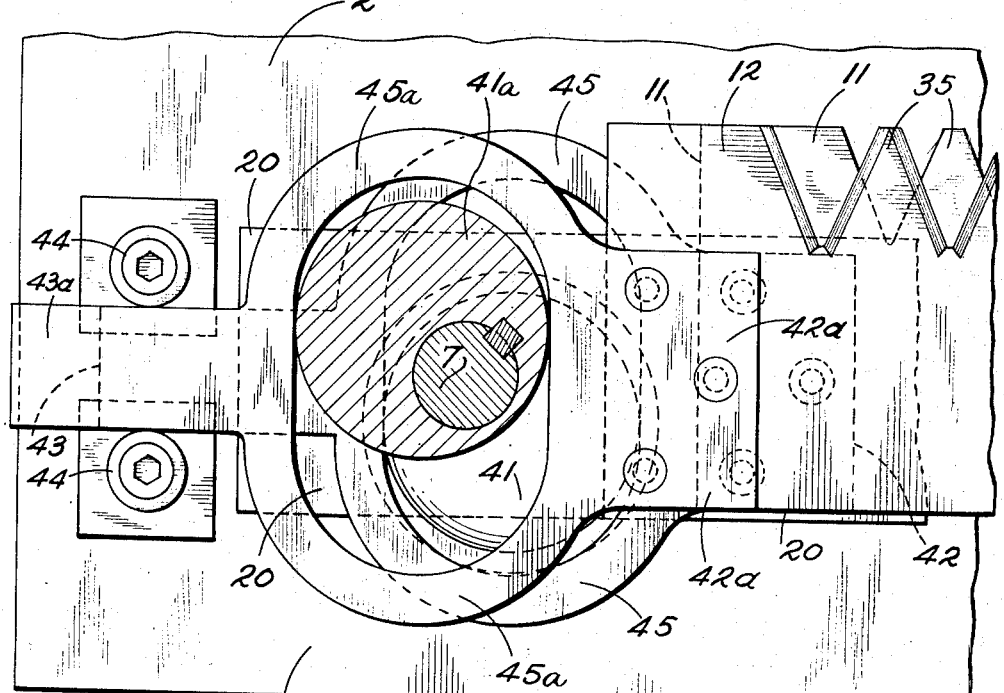
Fig. 7 is a fragmentary, enlarged, partly sectional, top plan view of the knife bar actuating mechanism of Fig. 1 with the eccentrics shown at different parts of their stroke.

The cutter shown in the accompanying drawings is for attachment to a power driven device, for example, a tractor. Means for connecting the cutter to such a vehicle are shown in Figs. 1, 2 and 6 where a sheet metal carrier designated generally by numeral 1 has a horizontal part 2 to the upper side of which is secured the support bar presently to be described. An upright 3 secured to the horizontal part 2 and braced by strut 4 carries drive means 5 for rotating the shaft which actuates the reciprocable members. This drive means 5 may include any suitable drive mechanism but, as shown, consists of a hydraulic motor having a fluid drive 6 connected to shaft 7.

The cutter embodying the preferred form of the present invention and illustrated in Figs. 1 to 7, inclusive, includes a support bar 10, a knife bar 11 having endwise sliding contact with the support bar 10 and another similar knife bar 12 having sliding contact with the upper side of knife bar 11.

The support bar 10 is preferably hollow with blocks secured therewithin at longitudinally spaced places. As shown, it consists of a sheet metal plate having a lower, horizontal part 15, an upwardly inclined front portion 16, front and rear horizontal flanges 17 and 18 and a sheet metal top plate 19. Part 15 of the support bar rests at one end on a plate 20 which, in turn, rests on the upper side of the horizontal part 2 of the connecting means 1. A block 21 is disposed within part 15 of the support bar and an exterior block 22 is disposed beneath the front inclined part 16 of the support bar. Screws 23, which pass through filler block 21, plate 20 and into connecting part 2 serve to secure these several parts together. Screws 24, which extend through the forward flange 17 of support bar part 15, exterior block 22, plate 20 and into part 2 of the connecting means serve to clamp these parts together.

Filler blocks 25 are disposed at longitudinally spaced apart places within part 15 of the support bar and are secured thereto as by screws 36. The upper surfaces of these blocks 25 are substantially flush with the top surface of the rearwardly projecting flange 18 of part 15 of the support bar. The under side of top plate 19 rests on the top surface of flange 18 and on the top surfaces of blocks 25. At its forward edge, this plate 19 rests on the inclined upper surface of wall 16 of part 15 of the support bar and the top surface of plate 19 is substantially flush with the top surface of forwardly extending flange 17. Thus, the top surfaces of flange 17 and plate 19 constitute a laterally broad, longitudinally elongated surface on which knife bar 11 may rest and reciprocate. A plurality of guides 30 rest on the top surface of plate 19 and are secured in position as by screws 31 which extend down through the guides, through plate 19, block 25 and into part 15 of the support bar. These guides 30 have elongated, relatively narrow portions 30a to pass through elongated slots 32 in the knife bars and laterally projecting portions 30b to overlie the top surface of the top knife bar adjacent to slots 32. Thus, when the several guides 30 are secured in the assembled position just described, the knife bars 11 and 12 may be guided in their longitudinal movements and retained in assembled position by guides 30.

The support bar is quite resistant to forces tending to bend it. This result is traceable to the box-like formation of plate 10, the top plate 19, the filler blocks 25, the guides 30 and the screws 31 which hold these several parts in assembled position and clamp the plate 19 against plate 10 and blocks 25.

Figure 13:
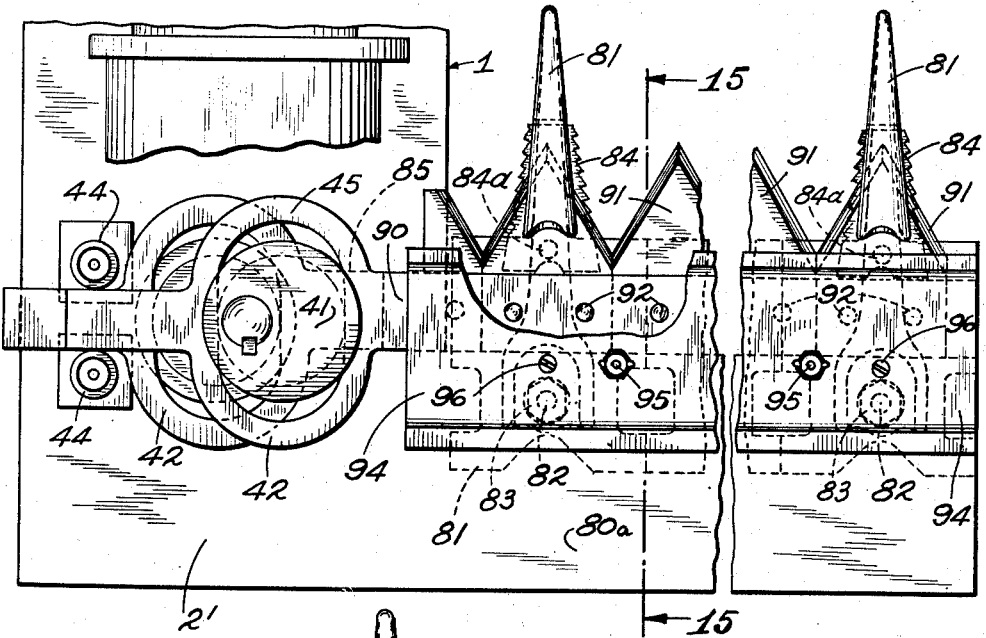
Fig. 13 is a fragmentary top plan view, with parts cut away, of another embodiment of the present invention.

The knife bars 11 and 12 are flat, elongated metal bars having cutting knives 35 projecting from the forward edges thereof. The edges of the knives on the lower bar 11 are beveled upwardly, as at 36', and the edges of the knives on the upper bar 12 are beveled downwardly, as at 37. Such beveling brings, back to back, the cutting edges of both sets of knives so that each knife acts as an abutment against which another knife presses an object to be cut. This construction eliminates the prior fixed ledger plates which acted as abutments against which the knives passed an object to be cut. It will be understood that instead of forming the knives integral with the knife bars, the knives may be made separately and riveted thereto, as illustrated in Figs. 11 and 13, or otherwise attached to a metal bar.

The two knife bars are reciprocated simultaneously in opposite directions by mechanism operatively associated with shaft 7, previously mentioned. The upper end of this shaft is attached to drive means 6 while the lower end is supported in bearings 40 positioned in plate 20. Shaft 7 has keyed thereto two eccentrics 41 and 41a which are positioned in diametrically opposite relation to one another on shaft 7, i. e., the centers of the eccentrics are on opposite sides of shaft 7 and lie in a vertical plane passing through the center of that shaft.

The lower knife bar 11 has an eccentric strap 42 projecting from its end adjacent to shaft 7. This strap has an endwise projecting guide portion 43 to move between bearings mounted on vertical posts 44 carried by the horizontal part 2 of connector 1. The eccentric strap 42 is provided with an elongated, transverse yoke 45 in which eccentric 41 may move when rotated. The upper knife bar 12 is similarly provided with an eccentric strap 42a, guide portion 43a and yoke 45a, guide portion 43a being guided by posts 44. Similarly, the upper eccentric 41a is movable in the elongated yoke 45a.

When shaft 7 is rotated, eccentrics 41 rotate with it and move in their respective elongated yokes. Since these eccentrics are oppositely mounted on shaft 7, they move the knife bars 11 and 12 simultaneously in opposite directions when shaft 7 is rotated. Since the two knife bars are substantially identical, any vibrational forces created by movement of one of these bars in one direction will be offset by corresponding vibrational forces caused by the movement of the other bar in the opposite direction with the result that the vibrations due to reciprocation of the knife bars will be kept to a minimum and, consequently, the stresses transmitted from the cutter to the tractor or other carrying means will be held to a minimum.

In the embodiment of the invention illustrated in Figs. 8 to 10, the lower knife bar 50 is quite like the lower knife bar 11 of Figs. 1 to 7 but differs therefrom in that it lacks the elongated slots 32 of the latter and is fixed in position against reciprocation. This bar 50 has round openings therethrough which are only slightly larger than screws 31 and the guides 51 which correspond to guides 30 of Figs. 1 to 7 extend through only the upper knife bar 12. Thus, the guides 51 bear against the upper surface of knife bar 50 and screws 31 serve to clamp the bar 50 in fixed assembled position with the support bar and the teeth of the lower knife-carrying member constitute fixed abutments toward which the knives of the upper bar 12 urge objects to be cut.

The lower eccentric strap 55 is like eccentric strap 42 of Figs. 1 to 7 except that it is not attached to the fixed knife bar 50 but is attached to the elongated member 56 which is positioned within the support bar between its upwardly inclined front portion and the filler blocks 25. Between the filler blocks 25 weights 57 may be attached to member 56 so that the total weight of this member and these attached parts will be approximately equal to the weight of the upper knife bar 12. This eccentric strap 55 is provided with an eccentric 41 which is rotatable in the transverse yoke of the strap in the manner described above in connection with Figs. 1 to 7, inclusive.

The operation of the embodiment of the invention shown in Figs. 8, 9 and 10 is substantially like that described above in connection with Figs. 1 to 7, inclusive, the principal difference being that the member 50 and the upper knife bar 12 are reciprocated simultaneously in opposite directions whereas in Figs. 1 to 7, the two knife bars were so reciprocated.

It is to be noted that the support bar shown in Figs. 1 to 10, inclusive, is characterized by lightness in weight but with great rigidity and resistance to bending. These results are traceable to the hollow box-like construction of the support bar and the cooperation of the parts of that bar including the filler blocks, guides and securing means.

It will also be noted that the knife bars are supported for free and easy, endwise, sliding movement with substantially complete freedom from friction due to bending of the support bar of the knife bars. The guides 30 hold the knife bars in assembled position but impose substantially no frictional resistance to their reciprocating movements.

Figs. 11 and 12 show a conventional cutter modified to embody the present invention. The conventional support bar 60 has a plurality of conventional knife guards 61 attached to its leading edge, as by bolts 62, and each guard carries a ledger plate 63 which is secured thereto, as by rivets 64. The conventional knife bar is replaced by knife bar 65 which has knives 66 attached to the underside thereof, as by rivet 67, the knives 66 resting partly on the top surface of support or cutter bar 60 and partly on the upper surface of ledger plates 63.

A guide 70, in the form of a rectangular bar, is positioned with its leading edge parallel to the cutter bar and engaging the trailing ends of knives 66 to guide the knives and knife bar 65 when the latter is reciprocated endwise. This guide 70 is secured to the support or cutter bar 60 as by cap screws 71. A reciprocable member 73, here shown in the form of a rectangular bar, rests on the top surface of cutter bar 60 with its leading edge being in guiding engagement with guide 70. A cover 75, which is secured in place by the cap screws 71, extends lengthwise of the cutter bar 60 for substantially the full length of travel of the knife bar 65 and extends forwardly from the trailing edge of reciprocable member 73 over the top thereof and over guide 70, and knife bar 65 and down along the leading edge of bar 65. At its leading and trailing edges, cover 75 has flanges 76 and 77, respectively, which are pressed against the top surface of the cutter bar 60 and the top surface of the knives 66 with a light spring pressure by the cap screws 71. The depending part 78 at the leading side of cover 75 serves as a guide for the front edge of knife bar 65 while the corresponding depending part 79 of the cover near its trailing edge acts as a guide for the trailing edge of reciprocable member 73.

A plurality of grease gun fittings 80 are provided on cover 75 so that grease may be forced into the space under the cover substantially to fill the space around the parts within the cover and to prevent ingress of dirt and other foreign bodies.

Knife bar 65 and reciprocable member 73 are attached at one end to eccentric straps 81 and 82, respectively, which are quite like eccentric straps 42 and 42a of Fig. 1, the main difference being in the form of the attachment of the straps to the knife bar 65 and reciprocating member 73. Since knife bar 65 is disposed in front of reciprocating member 73, that bar is attached to the front side of eccentric strap 81 while member 73 is connected to the trailing side of eccentric strap 82. These eccentric straps 81 and 82 have projecting guides 83 similar to guides 43 and are associated with eccentrics 41 and a rotatable shaft 84, all as has been described in connection with Fig. 1.

The apparatus shown in Figs. 11 and 12 operates substantially as follows: When the shaft 7 is rotated, the eccentrics 41 reciprocate the eccentric straps 81 and 82 and the latter cause the knife bar 65 and member 73 to reciprocate longitudinally of the cutter bar 60 simultaneously and in opposite directions. In these longitudinal movements, the knife bar 65 and its knives 66 are guided by guide 70 and the depending portion 78 to cover 75 while the reciprocable member 73 is guided by guide 70 and the depending part 79 of cover 75. Cutting is accomplished by movement of the edges 68 of knives 66 across the edges of ledger plates 63 in the conventional manner.

Figure 14:
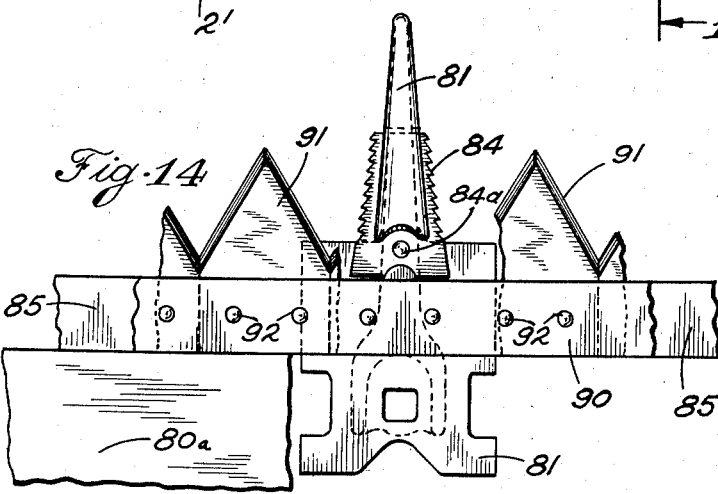
Fig. 14 is a fragmentary top plan view similar to Fig. 13 but with still other parts cut away.
Figure 15:
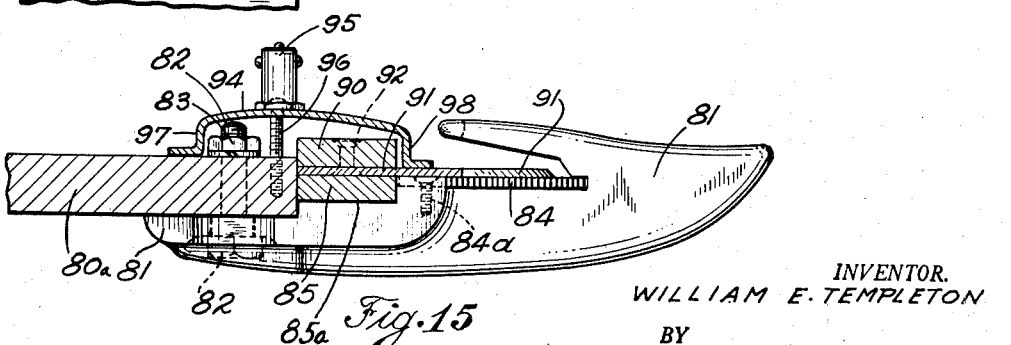
Fig. 15 is a vertical cross-sectional view taken on line 15—15 of Fig. 13.

Figs. 13 to 15 show still another modification of the present invention. In this embodiment the carrier 1 has a horizontal part 2' which is laterally extended as indicated at 80a to constitute an integral support bar for the reciprocating members and knife guards. Knife guards 81 project forwardly from the leading edge of bar 80a and extend beneath that bar and are secured to it as by bolts 82 which extend up through the guards and support bar and have nuts and washers 83 on the upper end thereof. These guards are in side-by-side contact with one another and in their forward portion carry ledger plates 84 secured thereto by screws 84a. Between the ledger plates and the forward edge of support bar 80a the guards are provided with aligned transverse recesses 85a in which an elongated member 85 is mounted for endwise movement. It will be noted that this member 85 has its leading and trailing longitudinal edges in guiding proximity to the leading longitudinal edges of the recesses in the guards and the leading edge of the support bar 80a. An elongated member in the form of knife bar 90 has secured to its under surface knives 91 as by countersunk rivets 92 and this knife bar is positioned with the knives engaging the top surfaces of member 85 and ledger plates 84. The trailing edge of bar 90 is engageable with the leading edge of support bar 80a and may be guided thereby when moving endwise. Bars 85 and 90 extend for substantially the full length of the support bar 80a.

A cover 94 provided with a plurality of grease gun fittings 95 spaced therealong is secured to bar 80a as by screws 96 which project therethrough and into tapped and threaded holes in bar 80a. This cover 94 has depending flanges 97 and 98 along its trailing and leading edges respectively and an upwardly bowed mid-portion between these flanges through which the screws 96 extend. Flanges 97 and 98 bear on the top surfaces of bar 80a and knives 91, respectively, and serve to impede the escape of lubricant supplied to the space within the cover through fittings 95. The ends of the cover are also formed with depending flanges to impede the escape of lubricant. Flange 98 also serves not only as a guide for knife bar 90 due to its proximity to the leading edge of the latter, but also to press the knives against the ledger plates.

The elongated members 85 and 90 are connected to eccentric straps 42 having elongated transverse yokes 45 in which an eccentric 41 may move when rotated and each eccentric strap has a guide portion projecting between guide posts 44. The eccentric straps, yokes, eccentric and guides are quite like those shown in the preceding modifications and described in connection therewith.

The operation of the embodiment of the invention shown in Figs. 13 to 15 is quite like that described above in connection with the other modifications, particularly the modification of Figs. 11 and 12. Rotation of the eccentric 41 causes the elongated members 85 and 90 to move endwise simultaneously but in opposite directions and thereby substantially to eliminate vibration due to reciprocation of the knife bar. The bar 85 is guided by support bar 80a and knife guards 81 while the knife bar 90 is guided by bar 80a and flange 98 of the cover 94. The knives 91 are pressed against the ledger plates 84 by the force exerted on the knives by cover 94. Lubricant, preferably grease introduced through fittings 95, may fill the space within the cover 94 and effectively lubricate the surfaces of the elongated members, support bar, knives and ledger plates.

From the foregoing description, it will be apparent to those skilled in the art that the present invention comprises a new combination of elements. So far as I know, no prior art device exists which consists of such a combination of elements and no prior device had the same mode of operation or gave the same results as does the apparatus of this new combination of elements.

While the various embodiments described above and disclosed in the drawings include specific parts, I desire it to be understood that mechanical equivalents of those various parts are contemplated as coming within the scope of the present invention and that such equivalents may be substituted for parts specifically disclosed herein.

Having thus described the present invention so that others skilled in the art may be able to understand and practice the same, I state that what I desire to secure by Letters Patent is defined in what is claimed.

What is claimed is:

1. A cutter to be power actuated comprising an elongated support bar, two members supported by and movable longitudinally of said bar, one of said members being approximately as long as said bar and having knives projecting from its leading edge, means to reciprocate said members simultaneously in opposite directions, said means including a shaft extending through said members at substantially right angles to the top surfaces thereof, and means engaging said members on opposite sides of said shaft for guiding said members in their reciprocating movements.

2. A cutter to be power actuated comprising an elongated support bar, two elongated knife bars supported by said support bar and having cutting knives projecting from their leading edges, means attached to said support bar and projecting through said knife bars to guide the latter in their endwise movements, and means to move said knife bars endwise simultaneously in opposite directions.

3. A cutter to be power actuated comprising an elongated support bar, two elongated knife bars supported by said support bar and having cutting knives projecting from their leading edges, means attached to said support bar and projecting through said knife bars to guide the latter in their endwise movements, and eccentric means to move said knife bars endwise simultaneously in opposite directions, said means including elongated yokes near one end of the knife bars and extending transversely of the longitudinal axis of the latter, a rotatable shaft extending through said yokes and eccentrics disposed in said shaft in diametrically opposed relation.

4. A cutter to be power actuated comprising an elongated support bar, two elongated knife bars supported by said support bar, one of said knife bars resting on the upper side of the other knife bar, said knife bars having cutting teeth projecting from their leading edges, means attached to said support bar and projecting through said knife bars to guide the latter in their endwise movements, and eccentric means to move said knife bars endwise simultaneously in opposite directions, said means including elongated yokes near one end of the knife bars and extending transversely of the longitudinal axis of the latter, a rotatable shaft extending through said yokes and eccentrics disposed in said yokes and connected to said shaft in diametrically opposed relation.

5. A cutter to be power actuated comprising an elongated support bar, two elongated knife bars supported by said support bar, one of said knife bars resting on the upper side of said support bar and the other knife bar resting on the upper side of the first knife bar, said knife bars having cutting teeth projecting from their leading edges, means attached to said support bar and projecting through said knife bars to guide the latter in their endwise movements, and eccentric means to move said knife bars endwise simultaneously in opposite directions, said means including elongated yokes near one end of the knife bars and extending transversely of the longitudinal axis of the latter, a rotatable shaft extending through said yokes and eccentrics disposed in said yokes and connected to said shaft in diametrically opposed relation.

6. A cutter to be power actuated comprising an elongated support bar, two elongated knife bars supported by said support bar and having cutting teeth projecting from their leading edges and guides projecting longitudinally from one end thereof, means attached to said support bar and projecting through said knife bars to guide the latter in their endwise movements, and eccentric means to move said knife bars endwise simultaneously in opposite directions, said means including elongated yokes near one end of the knife bars and extending transversely of the longitudinal axis of the latter, a rotatable shaft extending through said yokes and eccentrics disposed in said yokes and connected to said shaft in diametrically opposed relation.

7. A cutter to be power actuated comprising an elongated support bar box-shaped in cross-section, two elongated knife bars supported by said support bar and having cutting knives projecting from their leading edges, said bar including a hollow part and a top plate, blocks within said hollow part, means attached to and projecting through elongated slots in said knife bars to guide the latter in their endwise movements, and means securing said hollow part, top plate, blocks and guides together and clamping said top plate against said blocks and hollow part, and means to move said knife bars endwise simultaneously in opposite directions.

8. A cutter to be power actuated comprising an elongated support bar, two elongated members supported by said bar, one of said members having knives projecting from its leading edge, means attached to said support bar and projecting through said knife-carrying member to guide said members in their endwise movements, and means to move said members endwise simultaneously in opposite directions.

9. A cutter to be power actuated comprising an elongated, box-like support bar, two elongated members supported by said bar, the first of said members lying within said support bar and the second of said members lying on said support bar and having knives projecting from its leading edge, means within said support bar, projecting through said second member and engaging said members to guide said members in their endwise movements, and means to move said members endwise simultaneously in opposite directions.

10. A cutter to be power actuated comprising an elongated support bar, two members supported by and movable longitudinally of said bar, said members being approximately as long as said bar and at least one having knives projecting from its leading edge, means to reciprocate said members simultaneously in opposite directions, said means including a shaft extending through said members near one end thereof at substantially right angles to the top surfaces of the members, and means associated with said members and bar for guiding said members in their reciprocating movements.

11. A cutter to be power actuated comprising an elongated support bar, knife guards projecting from the leading edge of said bar, two members movable longitudinally of said bar, one of said members being approximately as long as said bar and having knives projecting from its leading edge, means to reciprocate said members simultaneously in opposite directions and means for guiding said members in their reciprocating movements; said guide means including a bar attached to the support bar disposed between said members and engaging the opposed edges of said members.

12. A cutter to be power actuated comprising an elongated support bar, knife guards projecting from the leading edge of said bar, two members supported by and movable longitudinally of said bar, one of said members being approximately as long as said bar and having knives projecting from its leading edge, means to reciprocate said members simultaneously in opposite directions, said means including a rotatable member extending through said members at substantially right angles to the top surface thereof, means associated with said members and bar for guiding said members in their reciprocating movements, and a cover connected to said support bar and extending over said members for retaining grease in contact with said members and excluding foreign materials.

13. A cutter to be power actuated comprising an elongated support bar, knife guards projecting from the leading edge of said bar, two members movable longitudinally of said bar, one of said members being approximately as long as said bar and having knives projecting from its leading edge, means to reciprocate said members simultaneously in opposite directions, means for guiding said members in their reciprocating movements, said guide means including a bar attached to the support bar disposed between said members and engaging the opposed edges of said members, and a cover attached to said bar, engaging said guide and extending over said members.

14. A cutter to be power actuated comprising an elongated support bar, knife guards projecting from the leading edge of said bar and secured against the under surface of the latter, ledger plates secured to the knife guards, an elongated, endwise movable member extending for substantially the full length of said support bar, an elongated knife bar disposed above said member and having knives secured against its lower surface and engaging the top surface of the said member and of said ledger plates, means to reciprocate said elongated members endwise simultaneously in opposite directions, said means including a shaft extending through said members near one end thereof and at substantially right angles to the top surfaces thereof, the knife guards having a groove extending thereacross at the leading edge of said support bar for guiding said elongated member and bar in their endwise movements, a cover connected to said support bar and extending over said knife bar and having flanges along its leading and trailing edges and engageable respectively with the top surfaces of the knives and of the support bar, and means securing said cover in position.

15. A cutter to be power actuated comprising an elongated support bar, knife guards projecting from the leading edge of said bar and having transverse aligned recesses in their top surfaces along the leading edge of the support bar, ledger plates secured in the knife guards, an elongated member movable endwise in said recesses, an elongated knife bar disposed above said elongated member and having knives secured against its lower surface and engaging the top surfaces of the elongated member and of the ledger plates, means to reciprocate said elongated members simultaneously in opposite directions, said means including a shaft extending through said members and eccentrics on said shaft and engaging each of the members, a cover connected to said support bar, extending over said knife bar and having a flange along its trailing edge engageable with the top surface of the support bar and a flange along its leading edge engageable with the top surfaces of the knives and with the leading edge of the knife bar, and means securing said cover in position and pressing said flanges against said opposed surfaces with lubricant retaining pressure.

16. A cutter to be power actuated comprising an elongated support bar, knife guards projecting from the leading edge of said bar, secured against the under surface of the latter and having transverse aligned recesses in their top surfaces along the leading edge of the support bar, ledger plates secured in the knife guards and projecting forwardly from the leading edge of said recess, an elongated member in said recesses and having guiding engagement with the leading and trailing edges of said recesses for endwise movement, an elongated knife bar disposed above said recess, engaging the trailing edge of said recesses and having knives secured against its lower surface and engaging the top surfaces of the said elongated member and of said ledger plates, means to reciprocate said elongated members simultaneously in opposite directions, said means including a shaft extending through said members and eccentrics on said shaft and engaging each of the members, a cover connected to said support bar and extending over said knife bar and having flanges along its leading and trailing edges and engageable respectively with the top surfaces of the knives and of the support bar, and means securing said cover in position and pressing said flanges against the opposed surfaces with lubricant retaining pressure, the knife bar being guided by the leading edge of the support bar and the flange on the leading edge of the cover.

References Cited in the file of this patent

UNITED STATES PATENTS

| | | |
|---|---|---|
| 536,924 | Dorney | Apr. 2, 1895 |
| 647,140 | Kissinger | Apr. 10, 1900 |
| 669,479 | Giffhorn et al. | Mar. 5, 1901 |
| 834,969 | Clarkson | Nov. 6, 1906 |
| 1,017,863 | Fulton | Feb. 20, 1912 |
| 1,649,002 | Swickard | Nov. 15, 1927 |
| 1,816,868 | Privat | Aug. 4, 1931 |
| 2,146,399 | Landrey | Feb. 7, 1939 |
| 2,345,383 | Curtis | Mar. 28, 1944 |